United States Patent
Sugimoto

(10) Patent No.: US 11,401,907 B2
(45) Date of Patent: Aug. 2, 2022

(54) CONTROL APPARATUS FOR INTERNAL COMBUSTION ENGINE

(71) Applicant: TOYOTA JIDOSHA KABUSHIKI KAISHA, Toyota (JP)

(72) Inventor: Hitoki Sugimoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/399,517

(22) Filed: Aug. 11, 2021

(65) Prior Publication Data
US 2022/0120252 A1 Apr. 21, 2022

(30) Foreign Application Priority Data
Oct. 16, 2020 (JP) .............................. JP2020-174604

(51) Int. Cl.
*G01M 15/11* (2006.01)
*F02P 5/15* (2006.01)
(Continued)

(52) U.S. Cl.
CPC .............. *F02P 5/045* (2013.01); *F02D 37/02* (2013.01); *F02D 41/024* (2013.01); *F02D 41/0255* (2013.01); *F02P 5/14* (2013.01); *F02P 5/1504* (2013.01); *G01M 15/11* (2013.01); *B60L 2240/423* (2013.01);
(Continued)

(58) Field of Classification Search
CPC ............. B60L 2240/423; F02D 41/024; F02D 41/0255; F02D 2200/0802; F02D 2200/1002; F02D 2200/1004; F02D 2200/1015; F02P 5/14; F02P 5/1504; G01M 15/11

USPC ....... 73/114.11; 123/406.23, 406.27, 406.44, 123/406.55
See application file for complete search history.

(56) References Cited

U.S. PATENT DOCUMENTS 5,278,760 A * 1/1994 Ribbens ................. F02D 41/22
701/99
5,452,699 A * 9/1995 Rossignol ............ G01M 15/042
73/114.11
(Continued)

FOREIGN PATENT DOCUMENTS

JP 2014-234737 A 12/2014

*Primary Examiner* — Erick R Solis
(74) *Attorney, Agent, or Firm* — Oblon, McClelland, Maier & Neustadt, L.L.P.

(57) ABSTRACT

An internal combustion engine of a vehicle is equipped with a plurality of cylinders, and ignition devices provided for the cylinders respectively. The vehicle is mounted with an ECU. The ECU performs an ignition timing decision process for deciding a basic ignition timing of the ignition devices in accordance with a load of the internal combustion engine. The ECU performs a misfire determination process for determining that a misfire has occurred on a condition that the torque has decreased below a threshold set in advance. The ECU performs a retardation process for controlling an ignition timing toward a retardation side from the basic ignition timing when a state of the vehicle satisfies a condition determined in advance. A determination on the occurrence of a misfire based on a relationship in magnitude between the torque and the threshold is not made during the retardation process, in the misfire determination process.

7 Claims, 3 Drawing Sheets

(51) Int. Cl.

| | |
|---|---|
| *F02D 41/00* | (2006.01) |
| *F02P 5/14* | (2006.01) |
| *F02P 5/04* | (2006.01) |
| *F02D 37/02* | (2006.01) |
| *F02D 41/02* | (2006.01) |

(52) U.S. Cl.
CPC ............... *F02D 2200/0802* (2013.01); *F02D 2200/1002* (2013.01); *F02D 2200/1004* (2013.01); *F02D 2200/1015* (2013.01)

(56) References Cited

U.S. PATENT DOCUMENTS

| | | | | |
|---|---|---|---|---|
| 5,504,682 | A * | 4/1996 | Shiraishi | B60W 10/11 73/114.11 |
| 5,515,281 | A * | 5/1996 | Palazzetti | G01M 15/11 73/114.11 |
| 5,539,644 | A * | 7/1996 | Ichikawa | G01M 15/11 701/99 |
| 7,503,208 | B2 * | 3/2009 | Akimoto | B60W 30/20 73/114.03 |
| 8,423,262 | B2 * | 4/2013 | Matsushita | F02D 29/02 60/285 |
| 8,538,626 | B2 * | 9/2013 | Kumar | F02D 41/221 123/406.27 |
| 2007/0192015 | A1 * | 8/2007 | Konishi | F02D 41/1497 73/114.11 |
| 2014/0352414 | A1 | 12/2014 | Ito et al. | |
| 2016/0123247 | A1 * | 5/2016 | Mizoguchi | F02D 35/025 123/406.55 |

* cited by examiner

CONTROL APPARATUS FOR INTERNAL COMBUSTION ENGINE

CROSS-REFERENCE TO RELATED APPLICATION

This application claims priority to Japanese Patent Application No. 2020-174604 filed on Oct. 16, 2020, incorporated herein by reference in its entirety.

BACKGROUND

1. Technical Field

The present disclosure relates to a control apparatus for an internal combustion engine.

2. Description of Related Art

A vehicle of Japanese Unexamined Patent Application Publication No. 2014-234737 (JP 2014-234737 A) is a hybrid vehicle that is driven by an internal combustion engine and a motor-generator. The internal combustion engine is equipped with a plurality of cylinders and ignition devices for igniting fuel in the cylinders respectively. The hybrid vehicle is equipped with a control apparatus for the internal combustion engine. The control apparatus calculates a torque generated on an output shaft of the internal combustion engine at the time of combustion in the internal combustion engine. The control apparatus then obtains an average of the calculated torque within a certain period, and determines that a misfire has occurred when the average is smaller than a threshold set in advance.

SUMMARY

In an internal combustion engine, the timing when fuel is ignited by an ignition device may be controlled toward a retardation side from a basic ignition timing, in accordance with an operating condition of the internal combustion engine. In the case where the ignition timing is controlled toward the retardation side, the torque generated on the aforementioned output shaft may become smaller than a torque in the case of ignition at the basic ignition timing.

In a control apparatus of Japanese Unexamined Patent Application Publication No. 2014-234737 (JP 2014-234737 A), a threshold is set as an upper-limit of a range of a torque at which a misfire can be regarded as having occurred in the case of ignition at a basic ignition timing. Therefore, when the ignition timing is controlled toward a retardation side, the torque of an output shaft may decrease below the threshold. That is, with the control apparatus described in JP 2014-234737 A, when the ignition timing is intentionally controlled toward the retardation side, it may be determined that a misfire has occurred despite normal combustion.

A control apparatus for an internal combustion engine for solving the aforementioned problem is a control apparatus that is applied to an internal combustion engine equipped with a plurality of cylinders and a plurality of ignition devices provided for the cylinders respectively. The control apparatus performs an ignition timing decision process for deciding a basic ignition timing of the ignition devices in accordance with a load of the internal combustion engine, a torque calculation process for calculating a torque of an output shaft that rotates with the internal combustion engine serving as a driving source, a misfire determination process for determining that a misfire has occurred, on a condition that the torque has decreased below a threshold set in advance, and a retardation process for controlling an ignition timing toward a retardation side from the basic ignition timing when a state of a vehicle mounted with the internal combustion engine satisfies a condition determined in advance. A determination on the occurrence of a misfire based on a relationship in magnitude between the torque and the threshold is not made during the retardation process, in the misfire determination process.

According to the foregoing configuration, it is not determined that a misfire has occurred even when the torque of the output shaft has decreased below the threshold, during the retardation process. Therefore, it can be prevented from being erroneously determined that a misfire has occurred although the torque of the output shaft has decreased as a result of the performance of the retardation process.

In the foregoing configuration, it may be determined that a misfire has occurred on a condition that the torque has decreased below a second threshold set smaller than a first threshold, during the retardation process, in the misfire determination process, when the threshold is referred to as the first threshold.

According to the foregoing configuration, it can be determined whether or not a misfire has occurred even during the retardation process, by comparing the torque of the output shaft and the second threshold with each other. Moreover, the second threshold is set smaller than the first threshold. Therefore, it is unlikely be determined that a misfire has occurred just because the torque of the output shaft decreases as a result of the performance of the retardation process. That is, the possibility of an erroneous determination on the occurrence of a misfire being made during the retardation process can be reduced by using the second threshold smaller than the first threshold.

In the foregoing configuration, the misfire determination process may not be performed during the retardation process. According to the foregoing configuration, the misfire determination process is not performed during the retardation process in which the torque of the output shaft tends to be unstable. Therefore, the processing load in the control apparatus can be reduced.

A control apparatus for an internal combustion engine for solving the aforementioned problem is a control apparatus that is applied to an internal combustion engine equipped with a plurality of cylinders and a plurality of ignition devices provided for the cylinders respectively. The control apparatus performs an ignition timing decision process for deciding a basic ignition timing of the ignition devices in accordance with a load of the internal combustion engine, a torque calculation process for calculating a torque of an output shaft that rotates with the internal combustion engine serving as a driving source, a misfire determination process for determining that a misfire has occurred, on a condition that the torque has decreased below a threshold set in advance, and a retardation process for controlling an ignition timing toward a retardation side from the basic ignition timing when a state of a vehicle mounted with the internal combustion engine satisfies a condition determined in advance. It is determined that a misfire has occurred on a condition that the torque is smaller than the threshold and that an air-fuel ratio of the internal combustion engine is higher than a prescribed air-fuel ratio determined in advance, during the retardation process, in the misfire determination process.

According to the foregoing configuration, it is not determined that a misfire has occurred just because the torque of the output shaft has decreased below the threshold during the retardation process. Therefore, it can be prevented from being erroneously determined that a misfire has occurred although the torque of the output shaft has decreased as a result of the performance of the retardation process. Besides, a determination on the occurrence of a misfire can be made with rather high accuracy even during the retardation process, by using the air-fuel ratio of the internal combustion engine as well as a comparison between the torque of the output shaft and the threshold as a condition for determining whether or not a misfire has occurred.

In the foregoing configuration, the retardation process may be performed on a condition that an increase in an intake air amount is equal to or larger than a certain value. Besides, fuel cutoff for stopping the supply of fuel to the cylinders may be carried out when an operating state of the internal combustion engine satisfies a condition determined in advance, in the vehicle, and the retardation process may be performed on a condition that a first period determined in advance or less has elapsed since the end of the fuel cutoff.

Besides, the vehicle may be equipped with a transmission device, and the retardation process may be performed on a condition that a second period determined in advance or less precedes or succeeds the making of a request to change over a shift speed of the transmission device.

Besides, the retardation process may be performed on a condition that a third period determined in advance or less has elapsed since the startup of the internal combustion engine. Besides, a catalyst provided in an exhaust passage of the internal combustion engine to control emission of exhaust gas passing through the exhaust passage may be arranged in the vehicle, and the retardation process may be performed on a condition that a temperature of the catalyst is lower than a prescribed temperature determined in advance.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
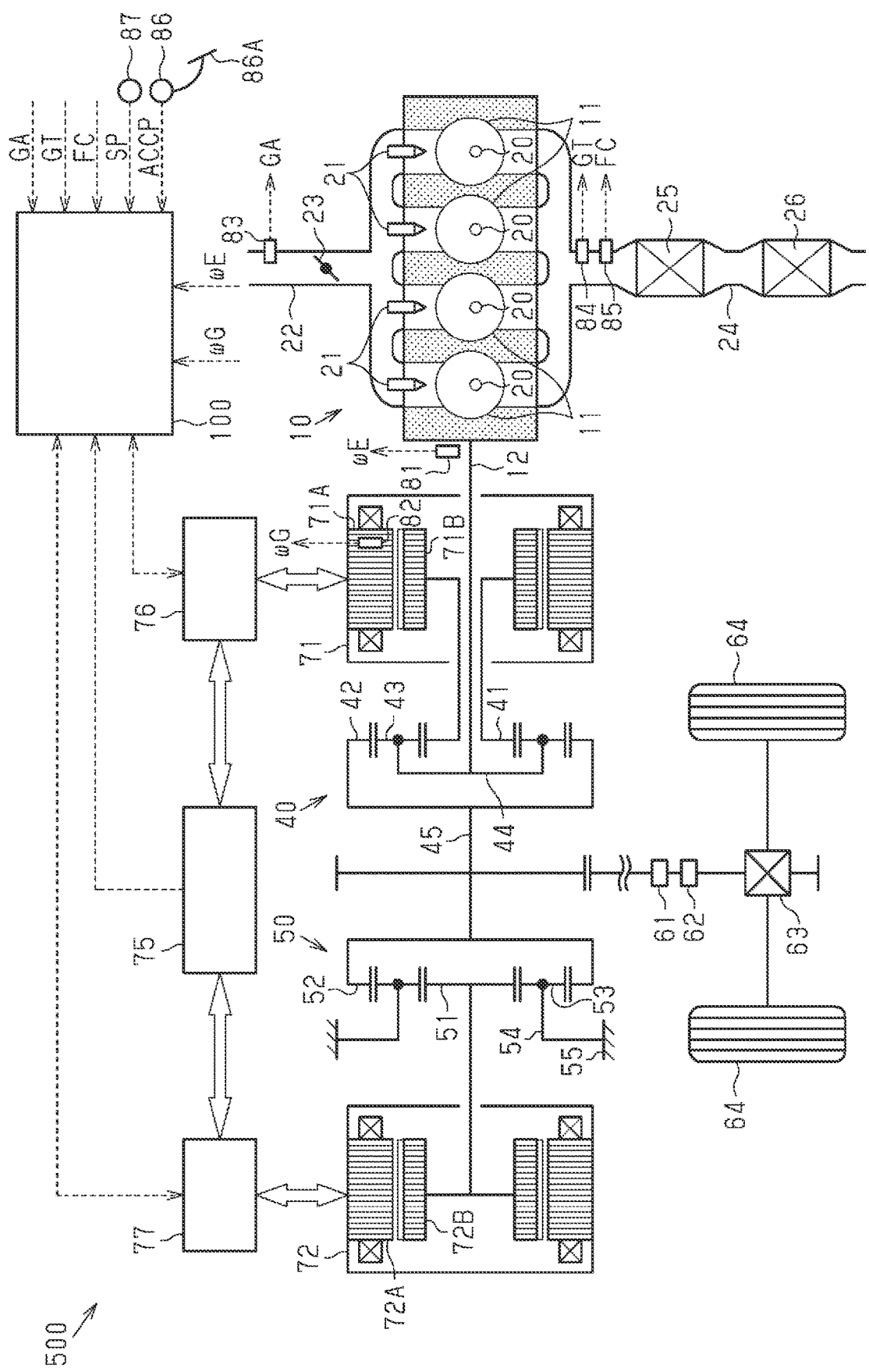
FIG. 1 is a schematic configuration view of a vehicle.

One of the embodiments of the present disclosure will be described hereinafter. First of all, the general configuration of a vehicle 500 to which a control apparatus of the present disclosure is applied will be described. As shown in FIG. 1, the vehicle 500 is equipped with an internal combustion engine 10, a first motor-generator 71, and a second motor-generator 72. Each of the first motor-generator 71 and the second motor-generator 72 functions as both an electric motor and an electric power generator. Accordingly, the vehicle 500 is a so-called hybrid vehicle.

The internal combustion engine 10 is equipped with a plurality of cylinders 11, an output shaft 12, a plurality of ignition devices 20, a plurality of fuel injection valves 21, an intake passage 22, a throttle valve 23, an exhaust passage 24, a catalyst 25, and a filter 26.

In the present embodiment, the internal combustion engine 10 is equipped with four cylinders 11. The intake passage 22 is connected to each of the cylinders 11. In concrete terms, the intake passage 22 branches off at some point into four passages that are connected to the cylinders 11 respectively. The intake air taken in from the outside of the internal combustion engine 10 reaches the interior of each of the cylinders 11 through the intake passage 22.

The throttle valve 23 is located upstream of the branching point of the intake passage 22. The throttle valve 23 adjusts the amount of intake air flowing into the cylinders 11 from the intake passage 22.

The fuel injection valves 21 are located in the vicinity of regions where the intake passage 22 is connected to the cylinders 11, respectively. The fuel injection valves 21 are provided for the cylinders 11 respectively. That is, the number of fuel injection valves 21 provided is four. The fuel injection valves 21 inject fuel into the intake passage 22. The injected fuel flows into the cylinders 11 after being mixed with intake air.

The ignition devices 20 are provided for the cylinders 11 respectively. That is, the number of ignition devices 20 provided is four. The ignition devices 20 ignite the air-fuel mixture by discharging sparks in the cylinders 11.

The exhaust passage 24 is connected to the cylinders 11. In concrete terms, an upstream region of the exhaust passage 24 branches off into four passages that are connected to the cylinders 11 respectively. The gas burned in the cylinders 11 reaches the outside of the internal combustion engine 10 through the exhaust passage 24.

The catalyst 25 is located downstream of the branching point of the exhaust passage 24. The catalyst 25 controls the emission of exhaust gas passing through the exhaust passage 24. In the present embodiment, a three-way catalyst is an example of the catalyst 25. The filter 26 is located downstream of the catalyst 25 in the exhaust passage 24. The filter 26 collects particulate matter contained in the exhaust gas passing through the exhaust passage 24.

The vehicle 500 is equipped with the output shaft 12. The output shaft 12 is coupled to pistons (not shown) that move in a reciprocating manner in the cylinders 11 respectively. The output shaft 12 rotates as the pistons move in a reciprocating manner as a result of the combustion of the air-fuel mixture in the cylinders 11. That is, the output shaft 12 rotates with the internal combustion engine 10 serving as a driving source.

The vehicle 500 is equipped with a first planetary gear mechanism 40, a ring gear shaft 45, a second planetary gear mechanism 50, an automatic transmission 61, a deceleration mechanism 62, a differential mechanism 63, and a plurality of driving wheels 64. The first planetary gear mechanism 40 is equipped with a sun gear 41, a ring gear 42, a plurality of pinion gears 43, and a carrier 44. The sun gear 41 is an external gear. The sun gear 41 is connected to the first motor-generator 71. The ring gear 42 is an internal gear, and can rotate concentrically with the sun gear 41. The pinion gears 43 are located between the sun gear 41 and the ring gear 42. The pinion gears 43 mesh with both the sun gear 41 and the ring gear 42. The carrier 44 supports the pinion gears 43 in such a state that the pinion gears 43 can rotate around axes thereof respectively and around the carrier 44. The carrier 44 is connected to the output shaft 12.

The ring gear shaft 45 is connected to the ring gear 42. The automatic transmission 61 is connected to the ring gear shaft 45. Although not shown in the drawing, the automatic transmission 61 is a stepped transmission device that is equipped with a plurality of planetary gear mechanisms and that enables stepwise changes in speed ratio. The automatic transmission 61 is connected to the right and left driving wheels 64 via the deceleration mechanism 62 and the differential mechanism 63. The deceleration mechanism 62 decelerates the torque input from the automatic transmission 61 at a predetermined deceleration ratio, and outputs the torque. The differential mechanism 63 allows rotational speeds of the right and left driving wheels 64 to be different from each other.

The second planetary gear mechanism 50 is equipped with a sun gear 51, a ring gear 52, a plurality of pinion gears 53, a carrier 54, and a case 55. The sun gear 51 is an external gear. The sun gear 51 is connected to the second motor-generator 72. The ring gear 52 is an internal gear, and can rotate concentrically with the sun gear 51. The ring gear 52 is connected to the ring gear shaft 45. The pinion gears 53 are located between the sun gear 51 and the ring gear 52. Each of the pinion gears 53 meshes with both the sun gear 51 and the ring gear 52. The carrier 54 supports the pinion gears 53 in a such a state that the pinion gears 53 can rotate around axes thereof respectively. The carrier 54 is fixed to the case 55. Accordingly, the carrier 54 supports the pinion gears 53 in such a state that the pinion gears 53 cannot rotate around the carrier 54.

The first motor-generator 71 has a stator 71A and a rotor 71B. The stator 71A has a substantially cylindrical shape. The rotor 71B is located inside the stator 71A. The rotor 71B cannot rotate relatively to the stator 71A. The rotor 71B is connected to the sun gear 41 of the first planetary gear mechanism 40. When the first motor-generator 71 functions as an electric motor, a torque is transmitted to the output shaft 12 via the first planetary gear mechanism 40. That is, the first motor-generator 71 is a driving source of the output shaft 12.

The second motor-generator 72 has a stator 72A and a rotor 72B. The stator 72A has a substantially cylindrical shape. The rotor 71B is located inside the stator 72A. The rotor 72B cannot rotate relatively to the stator 72A. The rotor 72B is connected to the sun gear 51 of the second planetary gear mechanism 50. When the second motor-generator 72 functions as an electric motor, a torque is transmitted to the output shaft 12 via the second planetary gear mechanism 50. That is, the second motor-generator 72 is a driving source of the output shaft 12.

The vehicle 500 is equipped with a battery 75, a first inverter 76, and a second inverter 77. When the first motor-generator 71 and the second motor-generator 72 function as electric power generators respectively, the battery 75 stores the electric power generated by the first motor-generator 71 and the second motor-generator 72. When the first motor-generator 71 and the second motor-generator 72 function as electric motors respectively, the battery 75 supplies electric power to the first motor-generator 71 and the second motor-generator 72.

The first inverter 76 adjusts the amount of electric power exchanged between the first motor-generator 71 and the battery 75. The second inverter 77 adjusts the amount of electric power exchanged between the second motor-generator 72 and the battery 75.

The vehicle 500 is equipped with a rotation sensor 81, a resolver 82, an airflow meter 83, an exhaust gas temperature sensor 84, an air-fuel ratio sensor 85, an accelerator depression amount sensor 86, and a vehicle speed sensor 87.

The rotation sensor 81 is located in the vicinity of the output shaft 12. The rotation sensor 81 outputs a detection signal corresponding to an angular velocity ωE of the output shaft 12. The resolver 82 is located in the stator 71A of the first motor-generator 71. The resolver 82 outputs a detection signal corresponding to an angular velocity ωG of the rotor 71B of the first motor-generator 71.

The airflow meter 83 is located upstream of the throttle valve 23 in the intake passage 22. The airflow meter 83 detects an intake air amount GA that is a flow rate of air passing through the intake passage 22 per unit time, and outputs a detection signal corresponding to a result of the detection.

The exhaust gas temperature sensor 84 is located upstream of the catalyst 25 in the exhaust passage 24. The exhaust gas temperature sensor 84 detects a temperature GT of exhaust gas passing through the exhaust passage 24, and outputs a detection signal corresponding to a result of the detection.

The air-fuel ratio sensor 85 is located upstream of the catalyst 25 in the exhaust passage 24. The air-fuel ratio sensor 85 detects a concentration FC of oxygen in the exhaust gas flowing through the exhaust passage 24, and outputs a detection signal corresponding to a result of the detection.

The accelerator depression amount sensor 86 detects an accelerator depression amount ACCP that is an operation amount of an accelerator pedal 86A operated by a driver of the vehicle 500, and outputs a detection signal corresponding to a result of the detection. The vehicle speed sensor 87 is located in the vicinity of an axle of the vehicle 500. The vehicle speed sensor 87 detects a vehicle speed SP of the vehicle 500, and outputs a detection signal corresponding to a result of the detection.

The vehicle 500 is mounted with the ECU 100. The ECU 100 acquires detection signals from various sensors attached to the vehicle 500. In concrete terms, the ECU 100 acquires a detection signal indicating the angular velocity ωE, a detection signal indicating the angular velocity ωG, a detection signal indicating the intake air amount GA, a detection signal indicating the temperature GT, a detection signal indicating the concentration FC of oxygen, a detection signal indicating the accelerator depression amount ACCP, and a detection signal indicating the vehicle speed SP.

The ECU 100 calculates a rotational speed NE that is a rotational speed of the output shaft 12 per unit time, based on the angular velocity ωE of the output shaft 12. The ECU 100 calculates an engine load factor KL based on the rotational speed NE and the intake air amount GA. It should be noted herein that the engine load factor KL represents a ratio of a current cylinder air inflow amount to a cylinder air inflow amount at the time when the internal combustion engine 10 is in steady operation with the throttle valve 23 fully open while the output shaft 12 of the internal combustion engine 10 rotates at the rotational speed NE. Incidentally, the cylinder air inflow amount is an amount of intake air flowing into each of the cylinders 11 in an intake stroke.

The ECU 100 estimates a temperature of the catalyst 25 based on the temperature GT of exhaust gas. For example, the ECU 100 estimates the temperature GT of exhaust gas as a temperature of the catalyst 25. The ECU 100 calculates an air-fuel ratio AF of the cylinders 11 based on the concentration FC of oxygen in exhaust gas. For example, the ECU 100 calculates the air-fuel ratio AF that increases as the concentration FC of oxygen rises.

The ECU 100 calculates a required torque of the vehicle 500 based on the accelerator depression amount ACCP and the vehicle speed SP. Besides, the ECU 100 controls the internal combustion engine 10, the first motor-generator 71, and the second motor-generator 72 such that the vehicle 500 satisfies the required torque. For example, the ECU 100 performs control such that the ratio of the torque output by the internal combustion engine 10 to the required torque of the vehicle 500 becomes large when the required torque of the vehicle 500 is large or when the charging capacity of the battery 75 is low.

The ECU 100 performs an ignition timing decision process, a torque calculation process, a misfire determination process, and a retardation process based on detection signals from the respective sensors. The details of these processes will be described later. Incidentally, in the present embodiment, the ECU 100 is an example of the control apparatus for the internal combustion engine 10.

The ignition timing decision process that is performed by the ECU 100 will be described. When the vehicle 500 runs normally, the ECU 100 decides a basic ignition timing A of the ignition devices 20 based on the engine load factor KL. In concrete terms, a map representing a relationship between the engine load factor KL and the ignition timing is stored in advance in the ECU 100. The ECU 100 then decides the basic ignition timing A by applying the engine load factor KL to the map.

The retardation process that is performed by the ECU 100 will be described. When the state of the vehicle 500 satisfies conditions determined in advance, the ECU 100 performs the retardation process. In the retardation process, the ignition timing of the ignition devices 20 is controlled toward the retardation side from the basic ignition timing A. For example, the following five conditions can be mentioned as the conditions determined in advance. The ECU 100 controls the ignition timing of the ignition devices 20 toward the retardation side when even one of the five conditions is satisfied.

The first condition for performing the retardation process is a condition that a first period determined in advance or less has elapsed since the end of fuel cutoff for stopping the supply of fuel to the cylinders 11 after carrying out fuel cutoff. The first period is a period determined in advance through an experiment as a certain period after a change from a negative torque state to a positive torque state as a result of a recovery of the vehicle 500 to a normal running state after the end of fuel cutoff.

The aforementioned fuel cutoff is carried out when the operating state of the internal combustion engine 10 satisfies a condition determined in advance. In the operating state of the internal combustion engine 10 in which fuel cutoff is carried out, for example, the required torque of the internal combustion engine 10 is equal to or smaller than a predetermined value. Incidentally, the required torque of the internal combustion engine 10 is, for example, a required torque output by the internal combustion engine 10 as part of the required torque of the entire vehicle 500 that is calculated based on the vehicle speed SP and the accelerator depression amount ACCP of the vehicle 500.

The second condition for performing the retardation process is that a second period determined in advance or less has elapsed since the making of a request to change over the shift speed of the automatic transmission 61. The second period is determined in advance through a simulation or the like as, for example, a period to definite engagement of engagement elements in the automatic transmission 61 after a changeover in shift speed in response to the making of a request to shift the speed of the automatic transmission 61.

The third condition for performing the retardation process is that a third period determined in advance or less has elapsed since the startup of the internal combustion engine 10. Incidentally, the pressure in the intake passage 22 is approximately equal to an atmospheric pressure before the startup of the internal combustion engine 10. Thus, the aforementioned third period is determined in advance as a period to stabilization of the pressure in the intake passage 22 in a negative pressure state through the startup of the internal combustion engine 10.

The fourth condition for performing the retardation process is a condition that the temperature of the catalyst 25 is lower than a prescribed temperature determined in advance. The ECU 100 estimates the temperature of the catalyst 25 calculated based on the temperature GT of exhaust gas detected by the exhaust gas temperature sensor 84. The ECU 100 then performs the retardation process when the estimated temperature of the catalyst 25 is lower than the prescribed temperature. The prescribed temperature is set in advance as a temperature at which sufficient performance of controlling the emission of exhaust gas can be exerted.

The fifth condition for performing the retardation process is a condition that the increase in the intake air amount GA is equal to or larger than a certain value. The increase in the intake air amount GA is obtained by subtracting the intake air amount GA preceding the latest intake air amount GA by one cycle therefrom. Incidentally, "the certain value" mentioned herein is determined in advance through an experiment or the like as an increase in the intake air amount GA that can lead to the occurrence of knocking in each of the cylinders 11.

Next, a series of types of control that is performed by the ECU 100 as to a determination on the occurrence of a misfire will be described. In the series of types of control regarding the determination on the occurrence of a misfire, the ECU 100 determines whether or not a misfire has occurred in any one of the cylinders 11. The ECU 100 repeatedly performs a series of processes regarding the determination on the occurrence of a misfire at predetermined intervals, with the internal combustion engine 10 driven. Incidentally, in the following description, it is assumed that the torque from the internal combustion engine 10 and the torque from the first motor-generator 71 act on the output shaft 12.

Figure 2:
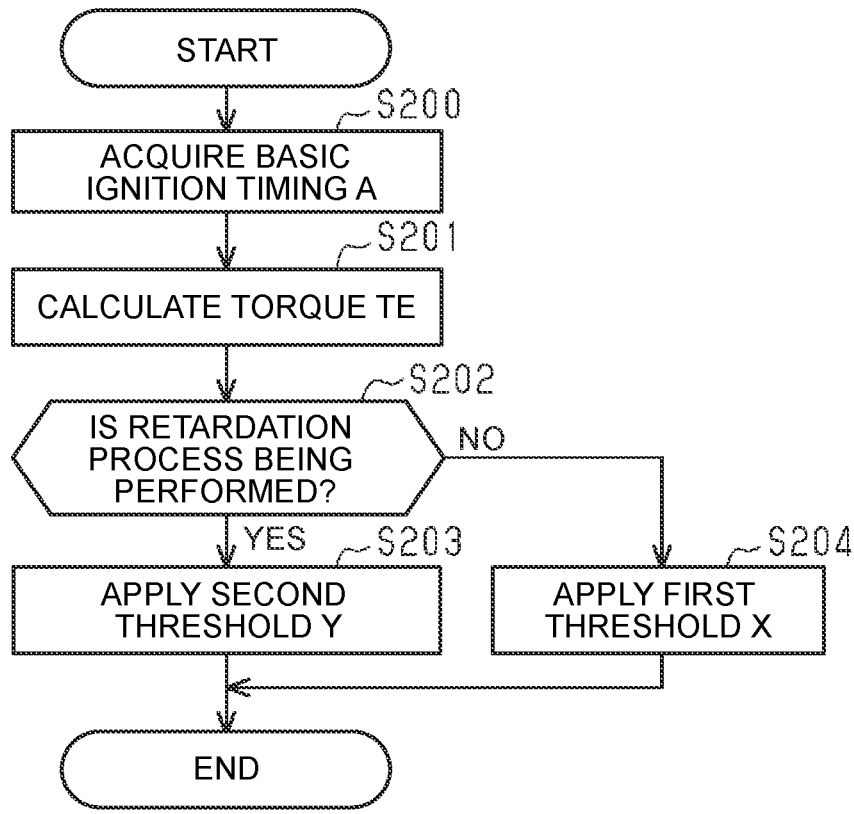
FIG. 2 is a flowchart of the control of a misfire determination process.

As shown in FIG. 2, the ECU 100 performs the processing of step S200 upon starting the series of types of control regarding the determination on the occurrence of a misfire. In step 200, the ECU 100 acquires the basic ignition timing A of the ignition devices 20. After acquiring the basic ignition timing A, the processing by the ECU 100 shifts to step S201.

In step S201, the ECU 100 calculates a torque TE that is generated on the output shaft 12 when the air-fuel mixture is burned in the internal combustion engine 10 at the basic ignition timing A. The torque TE is calculated based on an equation (1) shown below from state quantities of the internal combustion engine 10 and the first motor-generator 71.

$$TE = IE^* d\omega E + (1+\rho)/\rho^* (IG^* d\omega G - TG) \quad (1)$$

It should be noted herein that IE denotes an inertia moment of the internal combustion engine 10, that dωE denotes an angular acceleration obtained by differentiating the angular velocity ωE of the output shaft 12, and that ρ denotes a gear ratio of the first planetary gear mechanism 40. Besides, IG denotes an inertia moment of the first motor-generator 71, dωG denotes an angular acceleration obtained by differentiating the angular velocity ωG of the rotor 71B of the first motor-generator 71, and TG denotes a torque reaction force of the first motor-generator 71.

In the equation (1) shown above, the inertia moment IE of the internal combustion engine 10, the inertia moment IG of the first motor-generator 71, and the ratio ρ of the first planetary gear mechanism 40 are physical quantities and constants input to the ECU 100 in advance. Besides, the torque reaction force TG of the first motor-generator 71 is a value that is managed by the ECU 100 as a control parameter, and is always input to the ECU 100. After calculating the torque TE of the output shaft 12, the processing by the ECU 100 shifts to step S202.

In step 202, the ECU 100 determines whether or not the retardation process is performed. Incidentally, the respective conditions for performing the retardation process are mentioned above. If the retardation process is not performed (NO in S202), the processing by the ECU 100 shifts to step S204.

In step S204, the ECU 100 determines whether or not a misfire has occurred, based on a relationship in magnitude between the torque TE and a first threshold X. In concrete terms, the ECU 100 determines that a misfire has occurred when the torque TE is smaller than the first threshold X. The first threshold X is determined as a lower-limit of a torque that can be generated on the output shaft 12 when the internal combustion engine 10 is driven without causing a misfire after ignition at the basic ignition timing A. In this manner, the processing by the ECU 100 ends after it is determined based on the torque TE and the first threshold X whether or not a misfire has occurred.

On the other hand, if the retardation process is performed in step S202 (YES in S202), the processing by the ECU 100 shifts to step S203. In step S203, the ECU 100 determines whether or not a misfire has occurred, based on a relationship in magnitude between the torque TE and a second threshold Y. The second threshold Y is set smaller than the first threshold X. The ECU 100 determines that a misfire has occurred when the torque TE is smaller than the second threshold Y. Incidentally, the second threshold Y is determined as follows. For example, a torque of the output shaft 12 in the case where a misfire has actually occurred during the performance of the retardation process is obtained in advance through a simulation or the like. The second threshold Y is then set slightly larger than the value of the torque obtained through the simulation.

After thus determining, based on the torque TE and the second threshold Y, whether or not a misfire has occurred, the present process ends. Incidentally, in the present embodiment, the processing in step S200 is the ignition timing decision process for deciding the basic ignition timing A of the ignition devices 20 in accordance with the load of the internal combustion engine 10. The processing in step S201 is the torque calculation process for calculating the torque TE of the output shaft 12 that rotates with the internal combustion engine 10 serving as a driving source. Besides, the processing in steps S202 and S203 is the misfire determination process for determining that a misfire has occurred on the condition that the torque TE of the output shaft 12 has decreased below the first threshold X set in advance or the second threshold Y set in advance.

Figure 3:
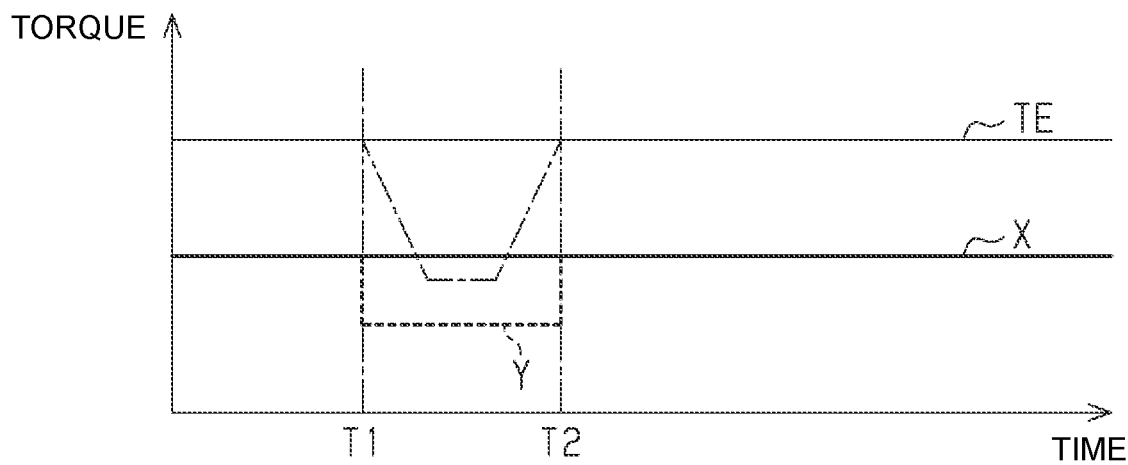
FIG. 3 is an illustrative view showing a relationship between torque and threshold.

Next, the operation of the present embodiment will be described. It is assumed that the torque TE at the basic ignition timing A is calculated as show in FIG. 3. Besides, it is assumed that the retardation process is performed between a timing T1 and a timing T2. Therefore, the torque of the output shaft 12 is smaller than the torque at the basic ignition timing A between the timing T1 and the timing T2. The torque TE temporarily decreases below the first threshold X between the timing T1 and the timing T2.

On the other hand, in the aforementioned misfire determination process, the second threshold Y is applied as a threshold for the determination on the occurrence of a misfire when the retardation is performed. The second threshold Y is set smaller than the first threshold X. Therefore, even when having decreased, the torque TE of the output shaft 12 does not decrease below the second threshold Y.

Next, the effect of the present embodiment will be described. (1) In the aforementioned embodiment, in the case where the retardation process is performed, the ECU 100 does not determine that a misfire has occurred, even when the torque TE of the output shaft 12 decreases below the first threshold X. Therefore, it can be prevented from being erroneously determined that a misfire has occurred, despite a decrease in the torque TE of the output shaft 12 resulting from the performance of the retardation process.

(2) In the aforementioned embodiment, in the case where the retardation process is performed, it is determined whether or not a misfire has occurred, by comparing the torque TE of the output shaft 12 and the second threshold Y with each other. Moreover, the second threshold Y is set smaller than the first threshold X. Accordingly, it is unlikely to be determined that a misfire has occurred, just because the torque TE of the output shaft 12 decreases as a result of the performance of the retardation process. That is, the possibility of an error being made in the determination on the occurrence of a misfire during the retardation process can be reduced by using the second threshold Y smaller than the first threshold X in the determination on the occurrence of a misfire.

(3) In the aforementioned embodiment, a condition that the increase in the intake air amount GA is equal to or larger than a certain value is adopted as one of the conditions for performing the retardation process. Knocking may be caused when the amount GA of intake air flowing into the cylinders 11 increases abruptly. Accordingly, the occurrence of knocking can be suppressed by performing the retardation process when an abrupt increase in the intake air amount GA is detected.

(4) In the aforementioned embodiment, a condition that the first period determined in advance or less has elapsed since the end of fuel cutoff for stopping the supply of fuel to the cylinders 11 is adopted as one of the conditions for performing the retardation process. For example, during the fuel cutoff process, there is a negative torque state in which torque is transmitted to the output shaft 12 side from the driving wheel 64 sides during the fuel cutoff process. After the end of fuel cutoff, however, this negative torque state shifts to a positive torque state in which torque is transmitted from the output shaft 12 side to the driving wheel 64 sides. When the transmission state of torque changes abruptly as in this case, the vehicle 500 may vibrate. In the present embodiment, an abrupt change in torque can be suppressed, and the foregoing vibration can be suppressed, by performing the retardation process within the first period from the end of fuel cutoff.

(5) In the aforementioned embodiment, a condition that the second period determined in advance or less has elapsed since the making of a request to change over the shift speed is adopted as one of the conditions for performing the retardation process. When the shift speed of the automatic transmission 61 is changed, the torque regarding the output shaft 12 changes in response to a changeover in shift speed. Then, a so-called shift shock, namely, a phenomenon that the vehicle 500 vibrates as the torque changes may occur. In the present embodiment, the torque TE of the output shaft 12 of the internal combustion engine 10 is reduced, and the difference in the torque TE of the output shaft 12 produced in changing over the shift speed is reduced to suppress the shift shock, by performing the retardation process in the second period from the making of a request to change over the shift speed.

(6) In the aforementioned embodiment, a condition that the third period determined in advance or less has elapsed since the startup of the internal combustion engine 10 is adopted as one of the conditions for performing the retardation process.

When the vehicle 500 runs normally, the pressure in the intake passage 22 of the internal combustion engine 10 is negative. On the other hand, immediately after the startup of the internal combustion engine 10, the pressure in the intake passage 22 of the internal combustion engine 10 is equal to the atmospheric pressure, and the amount GA of intake air flowing into the cylinders 11 of the internal combustion engine 10 is likely to increase.

Therefore, when the air-fuel mixture is burned in the internal combustion engine 10 at the basic ignition timing A, the rotational speed NE of the output shaft 12 of the internal combustion engine 10 may increase abruptly, and the vehicle 500 may vibrate. In the aforementioned embodiment, the vehicle 500 can be restrained from vibrating, by performing the retardation process within the third period from the startup of the internal combustion engine 10.

(7) In the aforementioned embodiment, a condition that the temperature of the catalyst 25 is lower than the prescribed temperature determined in advance is mentioned as one of the conditions for performing the retardation process. When the air-fuel mixture is burned at a timing retarded from the basic ignition timing A, the temperature of exhaust gas is likely to rise. Therefore, the warm-up performance of the catalyst 25 provided in the exhaust passage 24 is improved when the retardation process is performed.

The present embodiment can be carried out after being modified as follows. The present embodiment and the following modification examples can be carried out in combination with one another within such a range that no technical contradiction occurs. In the misfire determination process in the aforementioned embodiment, it may be determined whether or not a misfire has occurred, by performing control different from that in the example presented in the aforementioned embodiment.

Figure 4:
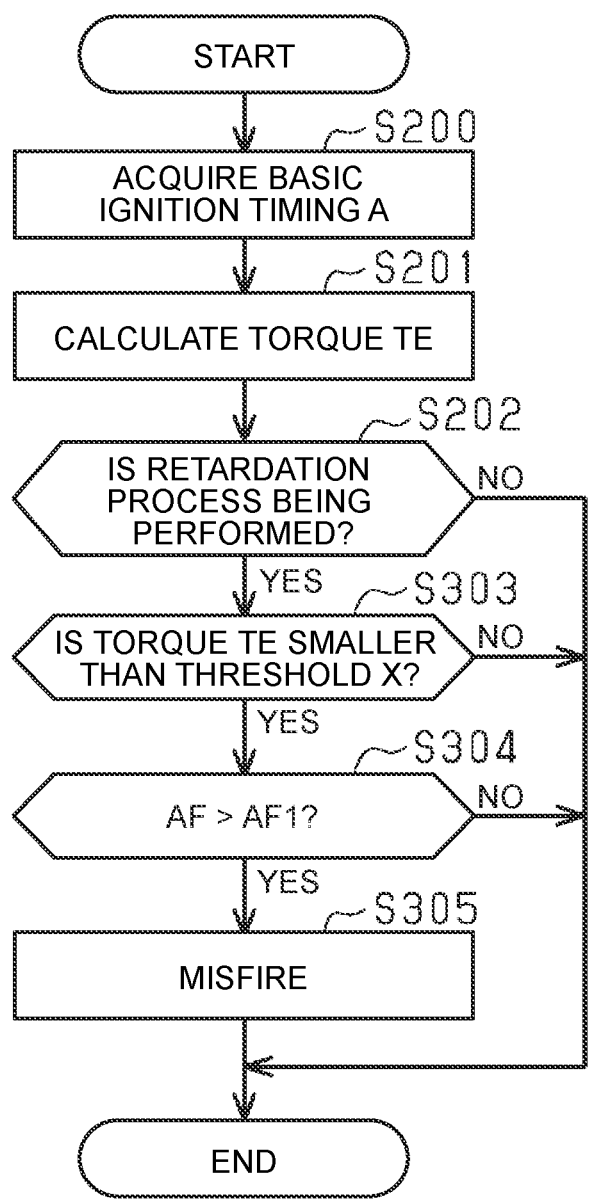
FIG. 4 is a flowchart of a misfire determination process in a modification example.

For example, in a series of kinds of control regarding a determination on the occurrence of a misfire in an example shown in FIG. 4, the ECU 100 performs the same process as in the aforementioned embodiment to step S202. If the retardation process is not being performed in step S202 (NO in S202), the process by the ECU 100 ends. If the retardation process is being performed in step S202 (YES in S202), the process by the ECU 100 shifts to step S303.

In step S303, the ECU 100 determines whether or not the torque TE calculated in step S201 is smaller than a threshold X. Incidentally, the threshold X is equivalent to the first threshold X in the first embodiment. If the torque TE is equal to or larger than the threshold X in step S303 (NO in S303), the process by the ECU 100 ends.

If the torque TE is smaller than the threshold X in step S303 (YES in S303), the process by the ECU 100 shifts to step S304.

In step S304, the ECU 100 calculates the air-fuel ratio AF based on the concentration FC of oxygen detected by the air-fuel ratio sensor 85. Then, the ECU 100 determines whether or not the calculated air-fuel ratio AF is larger than a prescribed air-fuel ratio AF1. If the air-fuel ratio AF is equal to or smaller than the prescribed air-fuel ratio AF1 (NO in S304), the process by the ECU 100 ends. If the air-fuel ratio AF is larger than the prescribed air-fuel ratio AF1 (YES in S304), the process by the ECU 100 shifts to step S305.

In step S305, the ECU 100 determines that a misfire has occurred in at least one of the cylinders 11, and the present process ends. That is, in the example of the misfire determination process shown in FIG. 4, it is determined that a misfire has occurred on the condition that the torque TE is smaller than the threshold X and that the air-fuel ratio AF of the internal combustion engine 10 is larger than the prescribed air-fuel ratio AF1 determined in advance, during the retardation process.

In the example of the misfire determination process shown in FIG. 4, it is not determined that a misfire has occurred during the retardation process, just because the torque TE of the output shaft 12 has decreased below the threshold X. Therefore, it can be prevented from being erroneously determined that a misfire has occurred, despite a decrease in the torque TE of the output shaft 12 resulting from the performance of the retardation process. Besides, it can be determined with rather high accuracy whether or not a misfire has occurred, even during the retardation process, by adopting the air-fuel ratio AF of the internal combustion engine as well as a comparison between the torque TE of the output shaft 12 and the threshold X as a condition for the determination on the occurrence of a misfire. Incidentally, the prescribed air-fuel ratio AF1 is calculated in advance as an air-fuel ratio leading to a determination that a misfire has occurred in a simulation or the like.

In the example of the misfire determination process shown in FIG. 4, the torque TE may be compared with a threshold smaller than the threshold X during the retardation process. In the example of the misfire determination process shown in FIG. 4, as a condition for determining whether or not a misfire has occurred during the retardation process, other conditions may be added to the condition on the torque TE of the output shaft 12 and the condition on the air-fuel ratio AF.

In the series of processes regarding the determination on the occurrence of a misfire in the aforementioned embodiment, the ECU 100 may end the misfire determination process instead of performing this process, when the retardation process is performed, in step S202. The torque TE of the output shaft 12 tends to be unstable during the retardation process. Therefore, the possibility of erroneously determining that a misfire has occurred is eliminated by refraining from performing the misfire determination process during the retardation process. Besides, since the misfire determination process is omitted, the processing load in the ECU 100 can be reduced.

The aforementioned embodiment has been described on the premise that the torque from the internal combustion engine 10 and the torque from the first motor-generator 71 act on the output shaft 12. However, the torque from the second motor-generator 72 may act on the output shaft 12. In this case, the torque from the second motor-generator 72 may also be taken into account in calculating the torque TE of the output shaft 12.

In the aforementioned embodiment, the configuration of the vehicle 500 is not limited to the example of the aforementioned embodiment. For example, the vehicle 500 may be a vehicle that is not mounted with the first motor-generator 71 or the second motor-generator 72 and that uses only the internal combustion engine 10 as a driving source.

In the aforementioned embodiment, the equation (1) is utilized to calculate the torque TE. However, the torque TE may be calculated through the use of another equation or according to another method. For example, the torque reaction force TG in the equation (1) may be omitted. Besides, in the case of, for example, a vehicle that is not mounted with the first motor-generator 71 and the second motor-generator 72, the torque of the output shaft 12 may be calculated with the term $(1+\rho)/\rho*(IG*d\omega G-TG)$ omitted in the equation (1). Incidentally, in this case, a term taking into account a reaction force applied to the output shaft 12 due to the effect of the torque, and the like may be added to the equation (1).

In the aforementioned embodiment, the conditions for performing the retardation process are not limited to the example of the aforementioned embodiment. The retardation process may be performed only when one of the five conditions exemplified in the aforementioned embodiment is satisfied. Alternatively, the retardation process may be performed when a condition other than the conditions exemplified in the aforementioned embodiment is satisfied. For example, the retardation process may be performed when the pressure or temperature in the cylinders 11 becomes too high for some reason.

What is claimed is:

1. A control apparatus for an internal combustion engine, the control apparatus being applied to an internal combustion engine equipped with a plurality of cylinders and a plurality of ignition devices provided for the cylinders respectively, and the control apparatus performing:
    an ignition timing decision process for deciding a basic ignition timing of the ignition devices in accordance with a load of the internal combustion engine;
    a torque calculation process for calculating a torque of an output shaft that rotates with the internal combustion engine serving as a driving source;
    a misfire determination process for determining that a misfire has occurred, on a condition that the torque has decreased below a threshold set in advance; and
    a retardation process for controlling an ignition timing toward a retardation side from the basic ignition timing when a state of a vehicle mounted with the internal combustion engine satisfies a condition determined in advance,
    wherein:
        a determination on occurrence of a misfire based on a relationship in magnitude between the torque and the threshold is not made during the retardation process, in the misfire determination process, and
        it is determined that a misfire has occurred on a condition that the torque has decreased below a second threshold set smaller than a first threshold, during the retardation process, in the misfire determination process, when the threshold is referred to as the first threshold.

2. A control apparatus for internal combustion engine, the control apparatus being applied to an internal combustion engine equipped with a plurality of cylinders and a plurality of ignition devices provided for the cylinders respectively, and the control apparatus performing:
    an ignition timing decision process for deciding a basic ignition timing of the ignition devices in accordance with a load of the internal combustion engine;
    a torque calculation process for calculating a torque of an output shaft that rotates with the internal combustion engine serving as a driving source;
    a misfire determination process for determining that a misfire has occurred, on a condition that the torque has decreased below a threshold set in advance; and
    a retardation process for controlling an ignition timing toward a retardation side from the basic ignition timing when a state of a vehicle mounted with the internal combustion engine satisfies a condition determined in advance, wherein
    it is determined that a misfire has occurred on a condition that the torque is smaller than the threshold and that an air-fuel ratio of the internal combustion engine is higher than a prescribed air-fuel ratio determined in advance, during the retardation process, in the misfire determination process.

3. The control apparatus for the internal combustion engine according to claim 1, wherein
    the retardation process is performed on a condition that an increase in an intake air amount in the vehicle is equal to or larger than a certain value.

4. The control apparatus for the internal combustion engine according to claim 1, wherein
    fuel cutoff for stopping supply of fuel to the cylinders is carried out when an operating state of the internal combustion engine satisfies a condition determined in advance, in the vehicle, and
    the retardation process is performed on a condition that a first period determined in advance or less has elapsed since end of the fuel cutoff.

5. The control apparatus for the internal combustion engine according to claim 1, wherein
    the vehicle is equipped with a transmission device, and
    the retardation process is performed on a condition that a second period determined in advance or less has elapsed since making of a request to change over a shift speed of the transmission device.

6. The control apparatus for the internal combustion engine according to claim 1, wherein
    the retardation process is performed on a condition that a third period determined in advance or less has elapsed since startup of the internal combustion engine.

7. The control apparatus for the internal combustion engine according to claim 1, wherein
    the vehicle is equipped with a catalyst provided in an exhaust passage of the internal combustion engine to control emission of exhaust gas passing through the exhaust passage, and
    the retardation process is performed on a condition that a temperature of the catalyst is lower than a prescribed temperature determined in advance.

* * * * *